United States Patent [19]

Jachim

[11] Patent Number: 5,469,004
[45] Date of Patent: Nov. 21, 1995

[54] ELECTRIC VEHICLE SOLENOID MOTOR

[76] Inventor: Frank M. Jachim, 3869 Riviera Cir., Bonita Springs, Fla. 33923

[21] Appl. No.: 242,644

[22] Filed: May 13, 1994

[51] Int. Cl.⁶ .................................................. H02K 33/00
[52] U.S. Cl. ................................................................. 310/24
[58] Field of Search ........................... 310/17, 20, 23, 310/24

[56] References Cited

U.S. PATENT DOCUMENTS

| | | | |
|---|---|---|---|
| 1,131,614 | 3/1915 | Radtke | 310/24 |
| 1,436,245 | 11/1922 | Geisler | 310/24 |
| 1,607,002 | 11/1926 | Keller | 318/139 |
| 1,886,040 | 11/1932 | Moodyman | 310/24 |
| 1,912,441 | 6/1933 | Foust | 310/24 |
| 3,589,346 | 6/1971 | Warren | 123/90.41 |
| 3,688,136 | 8/1972 | Salverda | 310/24 |
| 4,012,675 | 3/1977 | Schulze, Jr. | 310/24 X |
| 4,019,103 | 4/1977 | Davis et al. | 310/24 X |
| 4,020,370 | 4/1977 | Borello | 310/24 |
| 4,214,178 | 7/1980 | Tippner | 310/14 |
| 4,260,938 | 4/1981 | Joyes | 318/434 |
| 4,317,058 | 2/1982 | Blalock | 310/24 |
| 4,510,420 | 4/1985 | Sasso | 310/24 X |
| 4,631,455 | 12/1986 | Taishoff | 310/37 |
| 4,684,834 | 8/1987 | Hartman, Sr. | 310/24 |
| 4,749,893 | 6/1988 | Reynolds | 310/24 |
| 4,848,305 | 7/1989 | Lee | 123/637 |
| 5,136,217 | 8/1992 | Hoffman et al. | 318/135 |
| 5,187,464 | 2/1993 | Forgacs | 338/149 |
| 5,219,034 | 6/1993 | Wortham | 310/15 X |

FOREIGN PATENT DOCUMENTS

| | | | |
|---|---|---|---|
| 59312 | 12/1967 | Germany | 310/24 |

Primary Examiner—Steven L. Stephan
Assistant Examiner—Judson H. Jones
Attorney, Agent, or Firm—Randolph A. Smith

[57] ABSTRACT

An electric vehicle solenoid motor comprising a crankshaft disposed in a housing, at least one solenoid having a core operatively contacting the crankshaft; a power distribution control assembly disposed adjacent the crankshaft at the location of the protrusion; an electrical power source operatively connected to the solenoid so as to pass electric power through the power distribution control assembly to the solenoid; and wherein the power distribution control assembly has at least one power director disposed about the crankshaft. The power director has a contact moveable by the protrusion on the crankshaft such that rotation of the crankshaft causes displacement of the contact whereby the power director allows passage of electrical power from the electrical power source to the solenoid. This power energizes the solenoid and causes the core to retract into the solenoid pulling the connecting rod inwardly and moving the crankshaft to generate power.

20 Claims, 8 Drawing Sheets

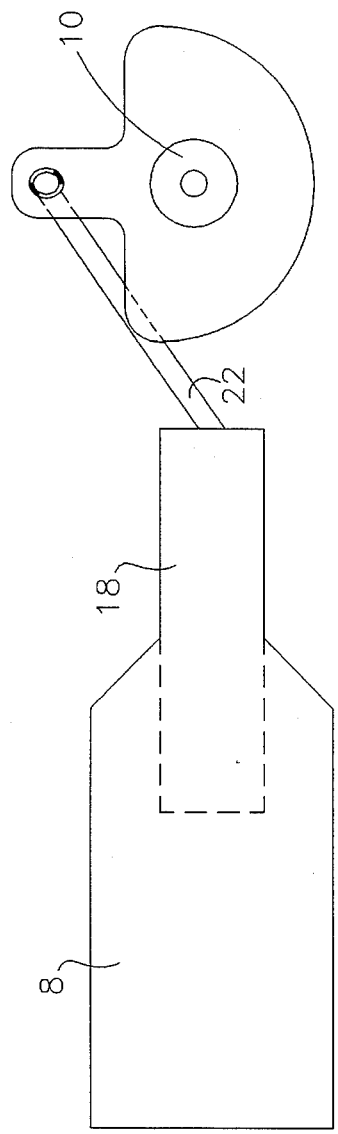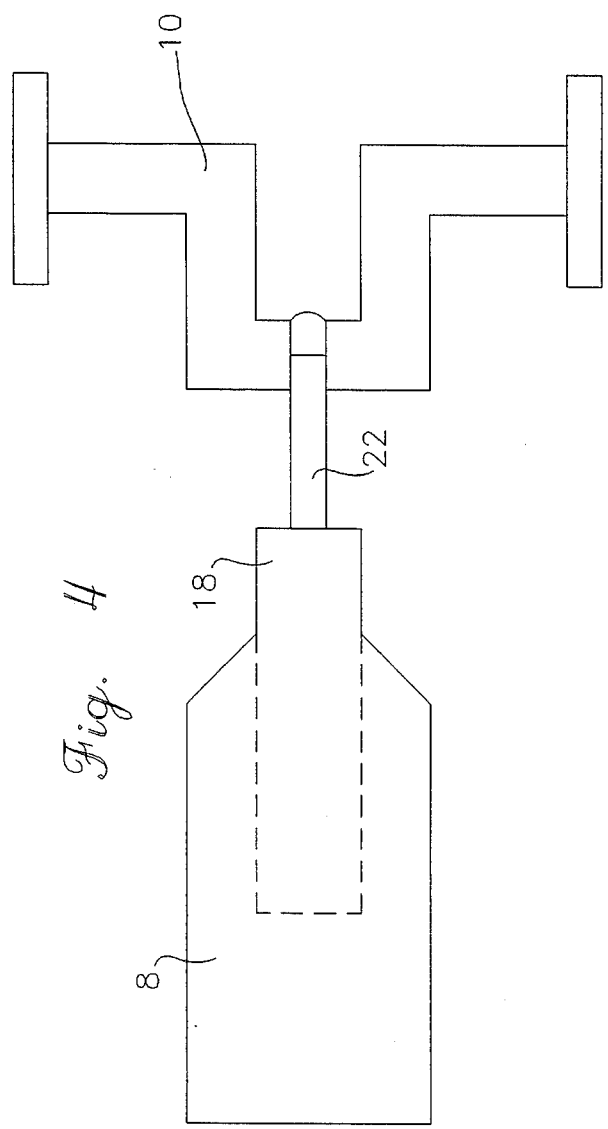

ELECTRIC VEHICLE SOLENOID MOTOR

BACKGROUND OF THE INVENTION

1. Field of the Invention

This invention relates to electric motors, and more specifically to an electrical power distribution system for a reciprocating electrical motor using solenoids.

2. Discussion of the Related Art

Traditional internal combustion engines cause pollution which is thought to cause severe ecological damage. While there have been many attempts to reduce pollution in the last several years, a hydrocarbon burning motor suitable for powering an automobile which emits no pollution is not available. Attention has therefore turned to powering automobiles with electricity.

Electric motors, utilizing a stator and a rotor, are well known in the art. Reciprocating electric motors, utilizing solenoids connected to a crankshaft, have also been constructed. (see U.S. Pat. No. 4,317,058 to Blalock and U.S. Pat. No. 4,749,893 to Reynolds, both of which are incorporated herein by reference.)

In a reciprocating electric motor, several solenoids are connected to a crankshaft and are fired in an appropriate sequence to cause the crankshaft to rotate in a fashion similar to an ordinary reciprocating gasoline motor. This results in an motor having a high torque to weight ratio which is fairly efficient.

A reciprocating motor using solenoids, suitable for use in an automobile, must be constructed with fairly large solenoids. Large solenoids require a supply of high amperage electricity which must be rapidly turned on and off to simulate the firing of pistons in a reciprocating motor. This causes problems because electricity has a tendency to arc between contact points of a switch when a large amount of current is turned on and off, and therefore the contact points of switches have a tendency to burn out. For this reason, the amount of power produced by a reciprocating motor using standard switching mechanisms is limited. Although high power anti-arc switches have been constructed, such as the liquid mercury anti-arc relay, these switching mechanisms are generally complicated and often expensive.

SUMMARY OF THE INVENTION

Accordingly, it is a primary object of this invention to provide an ecologically sound, light weight, high power, inexpensive, durable reciprocating electrical motor which is simple to design, highly efficient, easy to produce and repair, and utilizes common everyday parts.

According to a main aspect of this invention, an electric vehicle solenoid motor comprises a crankshaft disposed in a housing, at least one solenoid having a core operatively contacting the crankshaft; a power distribution control assembly disposed adjacent the crankshaft at the location of the protrusion; an electrical power source operatively connected to the solenoid so as to pass electric power through the power distribution control assembly to the solenoid; and wherein the power distribution control assembly has at least one power director disposed about the crankshaft. The power director has a contact moveable by the protrusion on the crankshaft such that rotation of the crankshaft causes displacement of the contact whereby the power director allows passage of electrical power from the electrical power source to the solenoid. This power energizes the solenoid and causes the core to retract into the solenoid pulling the connecting rod inwardly and moving the crankshaft to generate power.

BRIEF DESCRIPTION OF THE DRAWINGS

The above objects and features of the present invention will be apparent to those skilled in the art from the following description of the preferred embodiments thereof when considered in conjunction with the appended drawings in which:

FIG. 3 is a side view of a solenoid-crankshaft assembly of the present invention.

FIG. 4 is a top view of a solenoid-crankshaft assembly of the present invention.

DETAILED DESCRIPTION OF THE PREFERRED EMBODIMENTS

Figure 1:
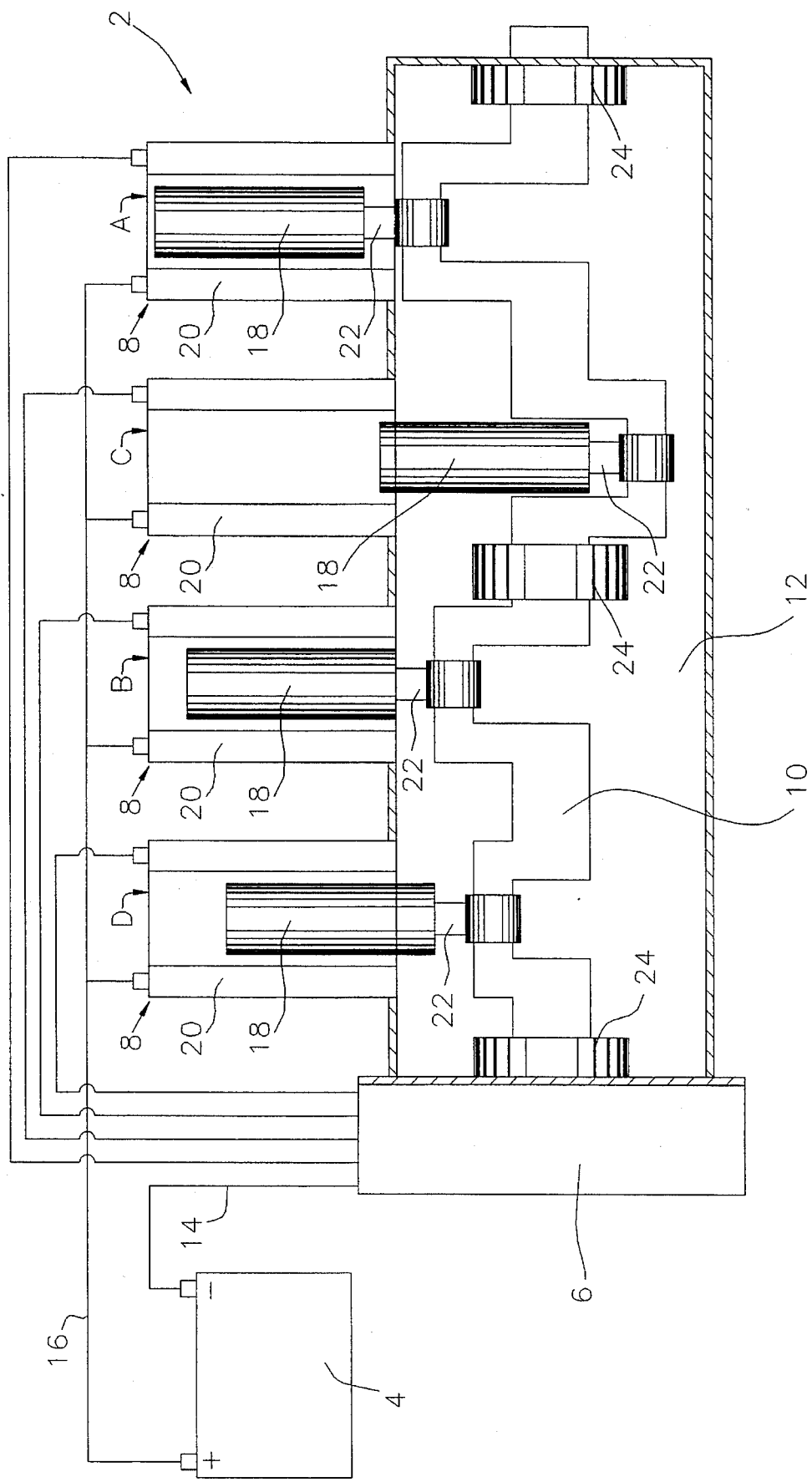
FIG. 1 is a side view, partially cut away, of an electric motor of the invention according to a first embodiment.

As shown in FIG. 1, a reciprocating electrical motor 2 is comprised of a power source 4, a power distribution control assembly 6, solenoids 8, a crank shaft 10 and a crankcase 12.

The power source 4, preferably includes four six volt direct current deep cycle rechargeable lead acid batteries connected in series. Other types of batteries may also be used to power the solenoids. Batteries are generally selected to be rechargeable, lightweight and capable of storing sufficient electrical energy to power an electrical motor for several hours.

The negative power cable 14 is connected from the negative terminal of the power source 4 to the input side of the power distribution control assembly 6. The positive power cable 16 is connected from the positive terminal of the power source 4 to the positive sides of each of solenoids 8. The negative power cable 14 and the positive power cable 16 are electrically conductive insulated cables, and preferably consist of 6 gauge twisted copper wire.

The solenoids 8 are preferably twenty-four volt direct current solenoids which are internally wired in the conventional manner or its equivalent. The solenoids 8 are preferably mounted on crankcase 12 in a straight line. Other mounting arrangements such as v-shaped or radially are also possible as well as any other conventional arrangement. Inside of each of the solenoids 8 is disposed a core 18 which is confined to linear movement within the body 20 of the solenoid 8. Stabilizing rings are disposed on solenoid cores to further reduce friction and to maintain alignment of the core 18 within the body 20. Preferably, the amount of friction experienced by core 18 while moving in and out of the solenoid body is minimized by lubricating the interface between body 20 and core 18 with oil or its equivalent. A splash system or pressure pump with a wet sump may be used to circulate the oil within the electrical motor to lubricate the moving parts. The solenoids 8 may be cooled by a liquid cooling system, air cooled by fins molded on the solenoid housings or by any other conventional method.

The connecting rods 22 are moveable rods attached between the core 18 and the crankshaft 10. Preferably, the connecting rods 22 are constructed of light-weight, high strength material such as aluminum or an aluminum alloy, but any other types of material which possess sufficient strength may also be used.

The crankshaft 10 is preferably a two cycle, four cylinder crankshaft, commonly used in marine motors, and is mounted in the crankcase 12 on three main bearings 24. The particular crankshaft depends mainly on the number of solenoids used and the type of placement of those solenoids on the electrical motor, i.e. straight-line placement, v-shaped placement, radial placement, etc.

Figure 2:
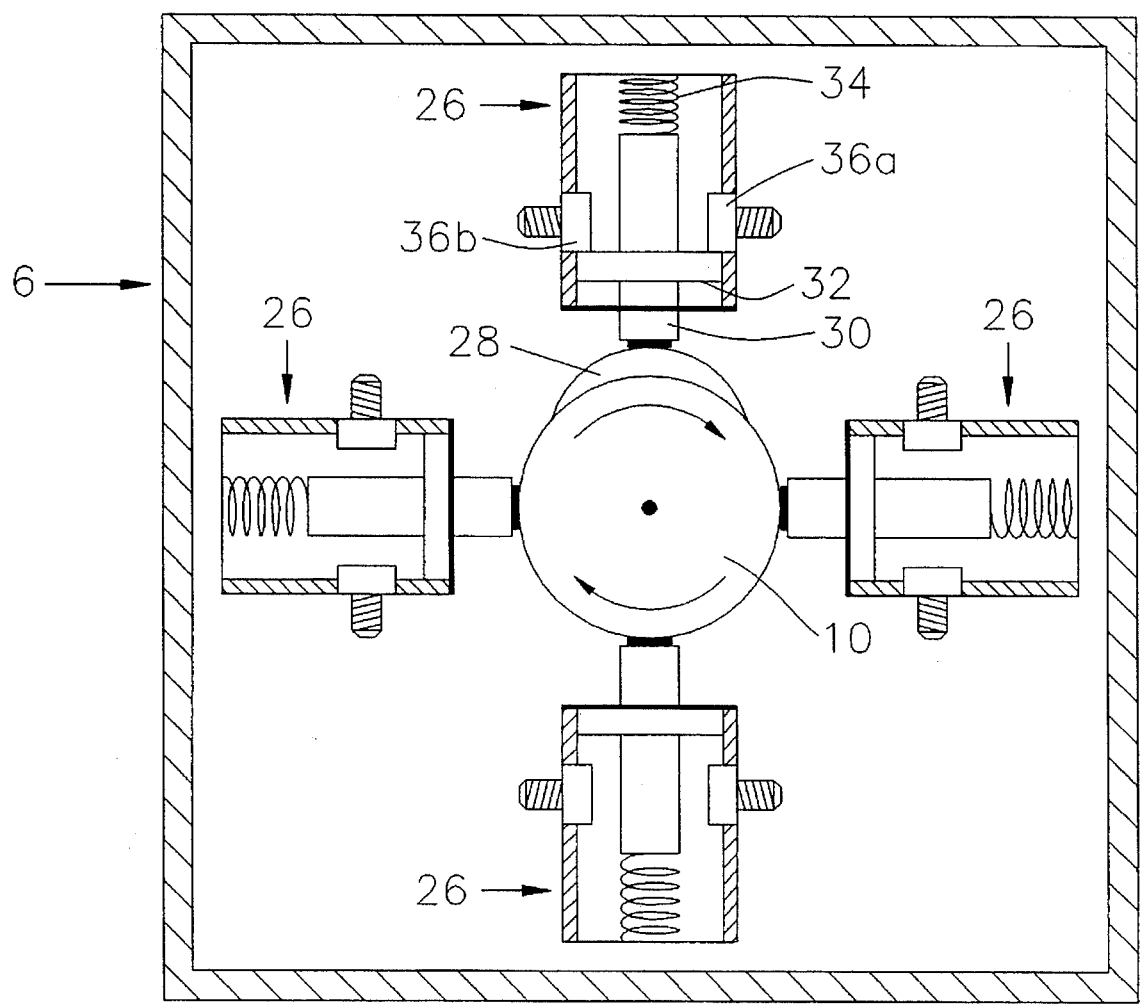
FIG. 2 is an end view, partially cut away, of the power distribution control assembly of the embodiment of FIG. 1.
Figure 5:
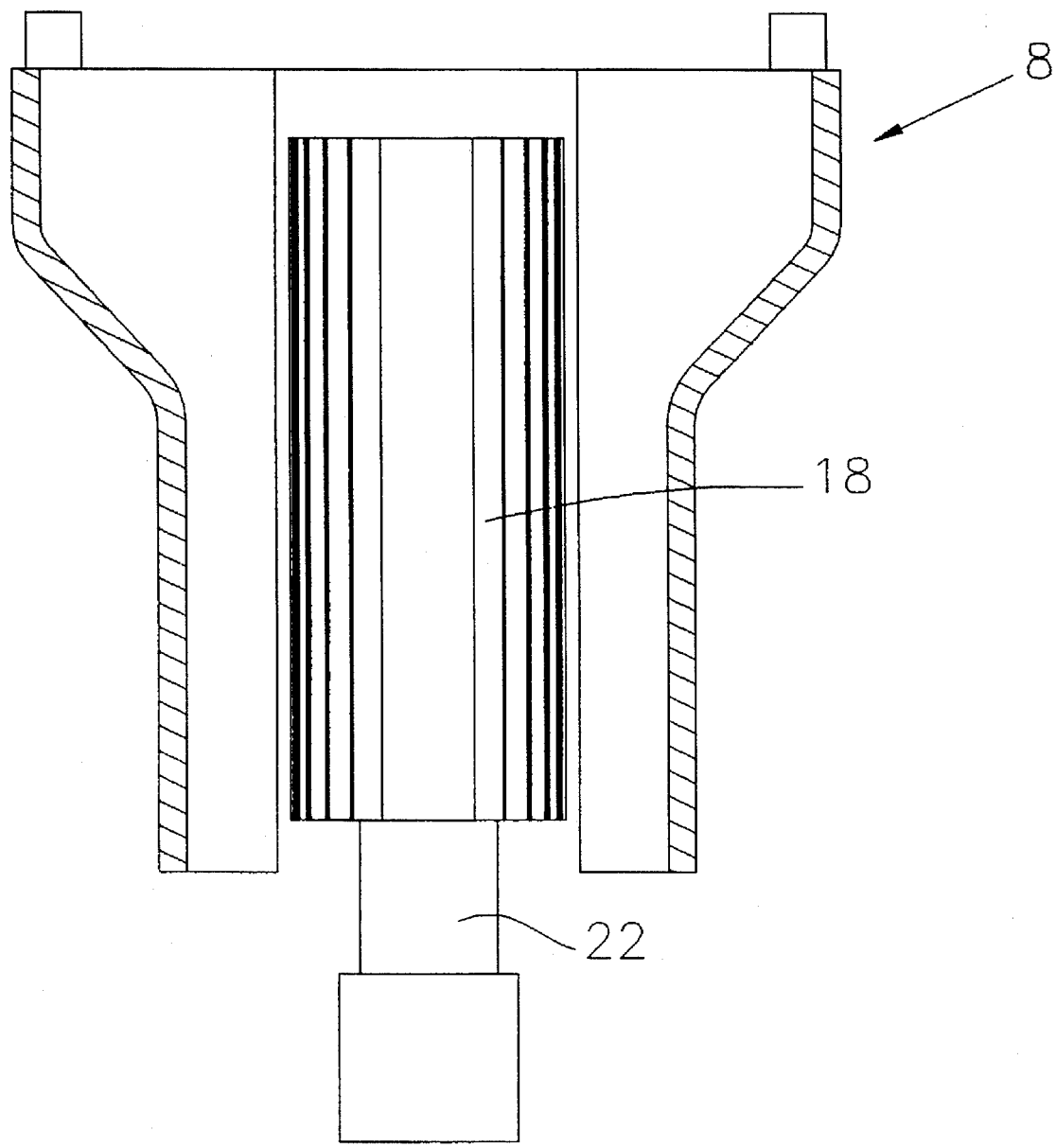
FIG. 5 is a side view, partially cut away, of a solenoid used in the present invention.

As shown in FIG. 2, the power distribution control assembly 6 comprises a set of power directors 26 concentrically disposed about the crankshaft 10. An eccentric lobe or protrusion 28 is disposed on and rotates with the crankshaft 10. The eccentric lobe 28 may be either integral with crankshaft 10 or attached to crankshaft 10 in any conventional manner. The power directors 26 are triggered by eccentric lobe 28, and are spaced equally radially about the center of the crankshaft 10.

For example, as shown in FIG. 2, when four power directors 26 are present, each power director 26 would be spaced about the center of the crankshaft 10 at ninety degree intervals.

The rotation of eccentric lobe 28 controls the intermittent closing of power directors 26, which pass direct current electrical energy to the solenoids 8. For the particular arrangement of the solenoids shown in FIG. 1, the firing sequence is A-C-B-D. Other firing sequences may be appropriate when a different crankshaft is used or a different number of cylinders is used. The firing sequence of the solenoids 8 is determined by wiring the appropriate solenoid 8 to the appropriate power director 26.

For example, in FIG. 1, if the firing sequence is A-C-B-D, the power director 26 at a 12 o'clock position would be connected to solenoid A, the power director 26 at a 3 o'clock position would be connected to solenoid C, the power director 26 at a 6 o'clock position would be connected to solenoid B and the power director 26 at a 9 o'clock position would be connected to solenoid D.

The power directors 26 are preferably spring loaded electrical switching devices, and are constructed to be able to transfer large amounts of electricity. The power directors 26 must also be constructed to resist arcing so that they can operate for an extended period of time without being replaced.

In the power director 26, the contact rod 30 is attached to the contact plate 32. A spring 34 urges a contact rod 30 against the crankshaft 10 so that the contact plate 32 does not contact the contacts 36a and 36b except when urged upwards by the eccentric lobe 28.

As demonstrated in FIG. 2, as crankshaft 10 rotates, the eccentric lobe 28 comes into contact with the contact rod 30 and exerts a linear or lifting force on it causing it to move in a radial direction. Because the contact rod 30 is attached to the contact plate 32, when the contact rod 30 moves radially, the contact plate 32 is forced into electrical communication with the contacts 36a and 36b.

The contact 36a is connected to the negative terminal of the power source 4, while the contact 36b is connected to one of the solenoids 8 by a wire. When the contact plate 32 is forced upwards, it forms an electrically conductive path between contacts 36a and 36b. This forms a circuit from the negative terminal of power source 4, through the power distributor 26 of the power distribution control assembly 6 to the solenoid 8 and back to the positive terminal of the power source 4. In this manner, the power distributor 26 causes the solenoid 8 to be energized.

After the eccentric lobe 28 passes the contact rod 30, the spring 34 continues to exert a force on the contact rod 30, causing it to remain in contact with the crankshaft 10 and severing the electrically conductive path between the contacts 36a and 36b.

As the crankshaft 10 rotates, the eccentric lobe 28 sequentially exerts a lifting force against the contact rods 30 of each of the power distributors 26, and causes them to form a circuit between the power source 4 and each solenoid 8.

When the solenoid 8 is energized, a magnetic field is formed which exerts a force on the core 18 which causes it to move in to the solenoid housing. As shown in FIGS. 3 and 4, core 18 is connected to connecting rod 22 which attaches to crankshaft 10. When core 18 is forced into the solenoid 8, it exerts a force on crankshaft 10 causing it to rotate on bearings 24.

In this manner, the solenoids 8 can be used to cause a crankshaft 10 in an electrical motor to rotate. To obtain optimum torque, it has been found to be desirable to trigger the solenoid 8 at the point where core 18 is extended at least one third out of the solenoid.

In this manner, the reciprocating electrical motor of the invention may be used to provide the motive force for an automobile or other similar vehicle. It should be noted, however, electrical motors suitable for other purposes, such as to power wheelchairs, lawn mowers, boats, trucks and airplanes may also be built in a similar manner.

Figure 6:
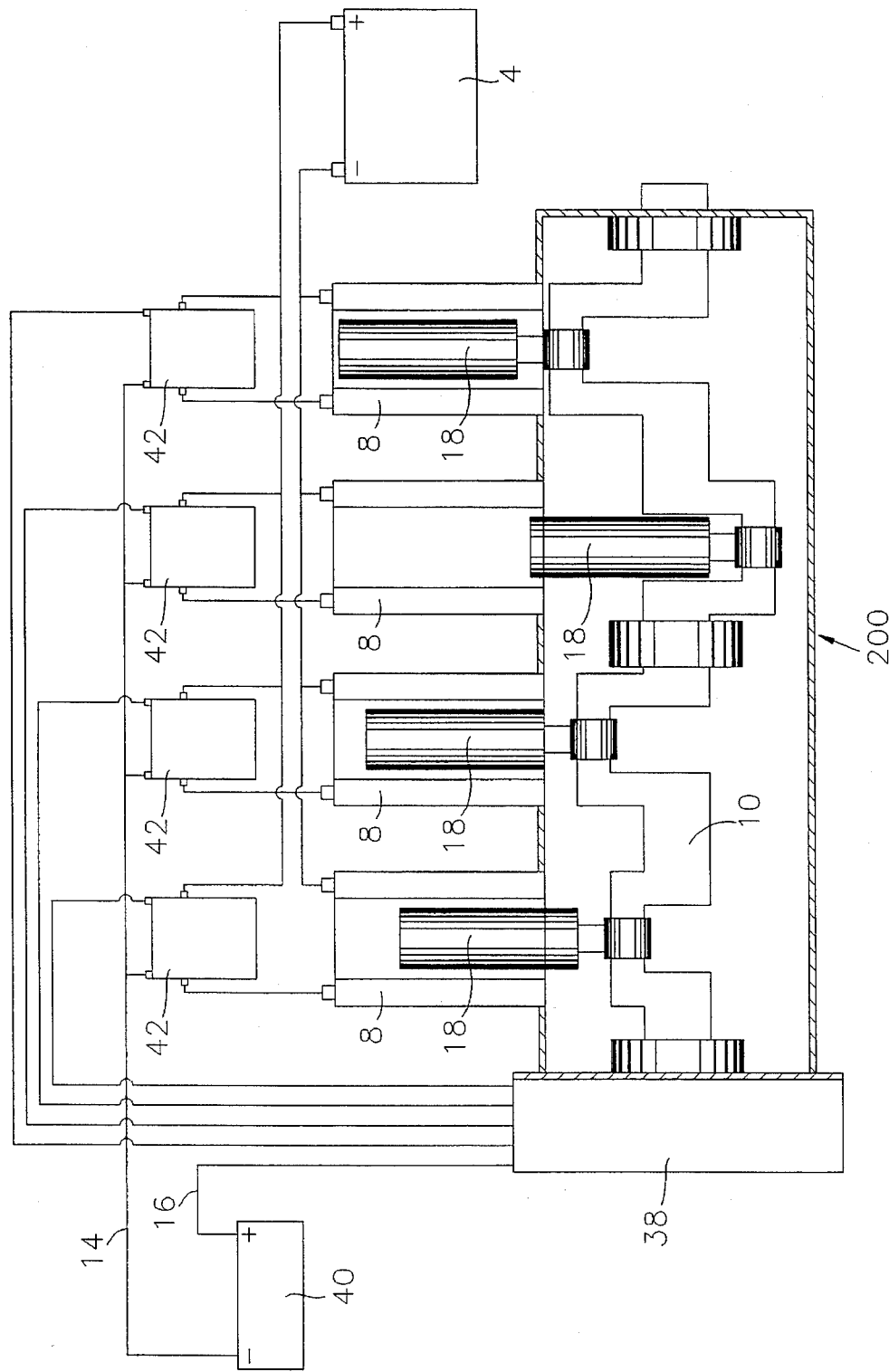
FIG. 6 is a side view, partially cut away, of an electric motor according to a second embodiment of the present invention.

Referring now to FIG. 6, in a second embodiment, the reciprocating electrical motor 200 comprises a low power distribution assembly 38 connected to a low power source 40. The low power distribution assembly 38 is connected to the low power solenoids 42 which are arranged to distribute high power from the high power source 4 to the solenoids 8.

The low power source 40 is preferably a twelve volt direct current deep cycle rechargeable lead acid battery, preferably selected to be lightweight and capable of storing sufficient electrical power to function for several hours. Most preferably, the second power source 40 is constructed to have an operational duration roughly equivalent to power source 4. Instead of utilizing two power sources, it is also possible to use only one power source and step down the voltage supplied to the second power distribution control assembly through resistors or other appropriate circuitry.

Figure 8:
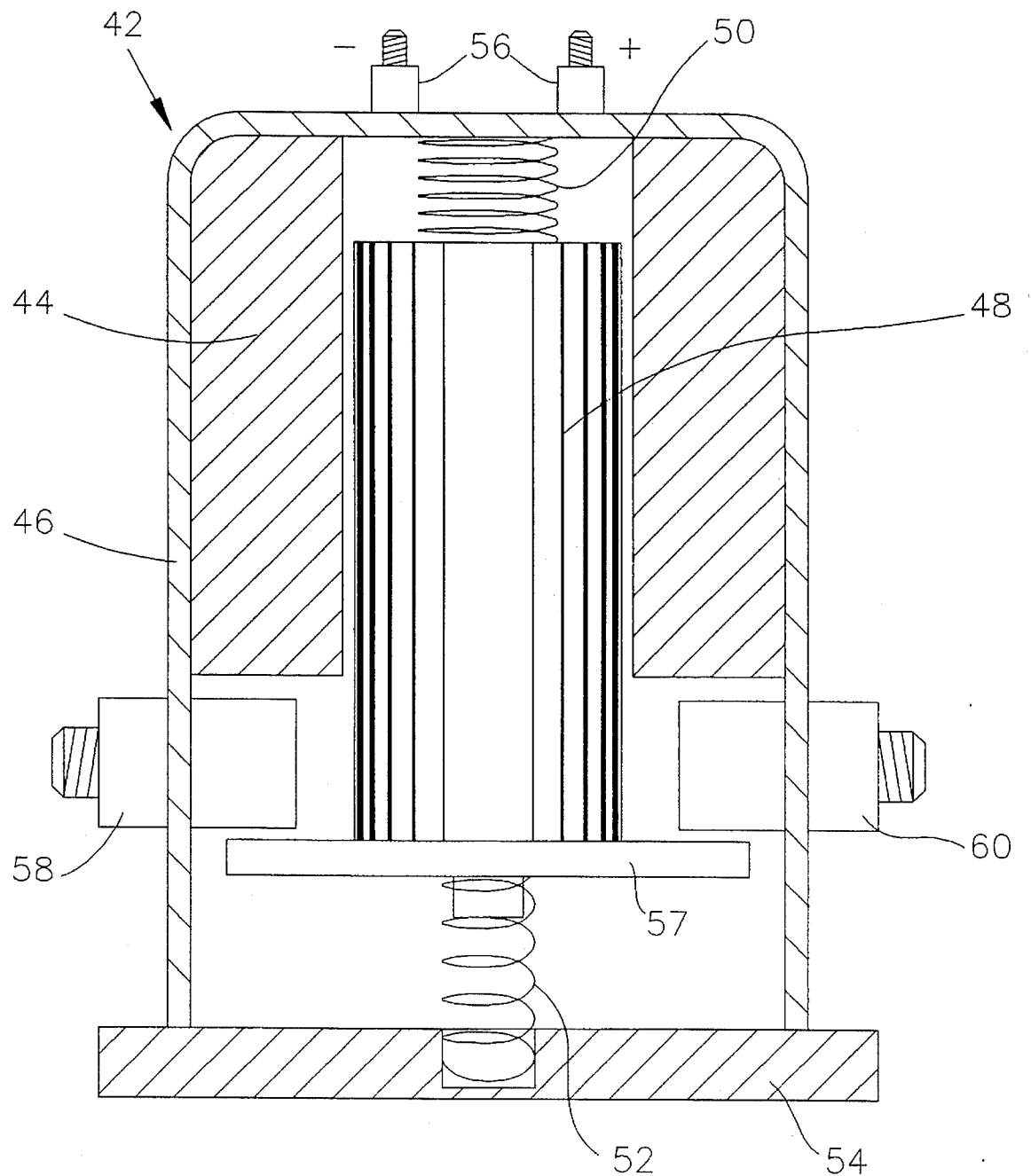
FIG. 8 is a side view, partially cut away, of another component of the power distribution control assembly of the second embodiment of the present invention.

Referring now to FIG. 8, the low power solenoids 42 are preferably low voltage, low amperage solenoids. Solenoids 42 have a wire coil 44 disposed inside a frame 46 and a core 48 disposed within the wire coil 44. The low power solenoids 42 preferably are internally wired in the conventional manner or its equivalent.

A spring 50 is disposed inside of the low power solenoid 42 between a frame 46 and one end of the core 48. When the low power solenoid 42 is not in electrical communication with the low power source 40, the spring 50 biases the core outward away from the inside of the frame 50. A spring 52 may be disposed between an end cap 54 to assist the spring 50 in biasing the core 48 away from the inside of the frame 46. The springs 50 and 52 are shown in compression and tension respectively in FIG. 8.

When electrical energy is supplied to one of the terminals 56 of the low power solenoid 42, the wire coil 44 is energized forming a magnetic field and pulling the core 48 into the void against the biasing forces of the springs 50 and 52. The contact plate 57 is attached to the end of the core 48. When the core 48 moves into the void of the wire coil 44, the contact plate 57 contacts high power terminals 58 and 60 to form an electrically conductive path between them.

Figure 7:
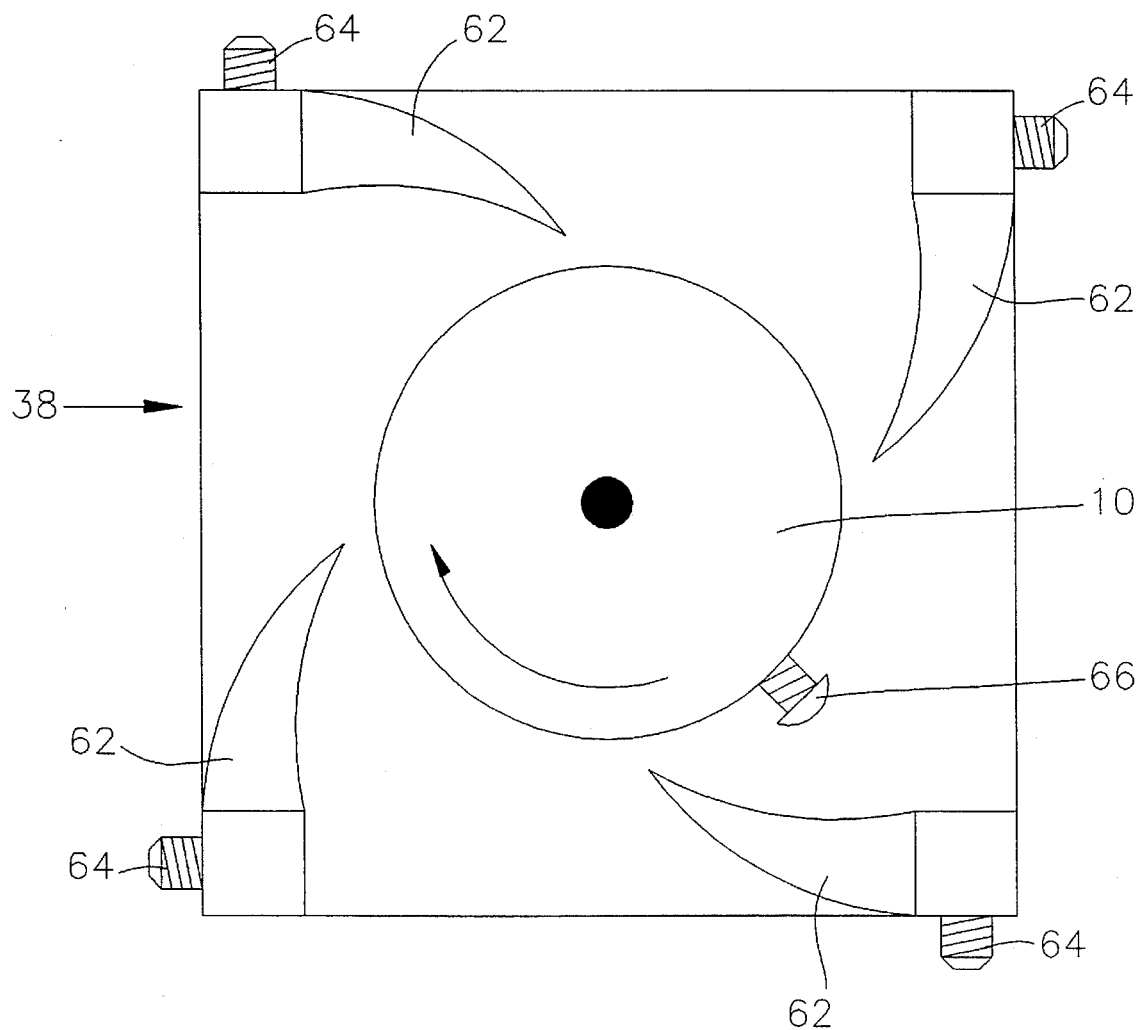
FIG. 7 is an end view, partially cut away, of one component of the power distribution control assembly of the second embodiment of the present invention.

As shown in FIG. 7, the low power distribution control assembly 38 has tines 62 attached to tine terminals 64 distributed circumferentially about crankshaft 10. A contact bar 66 is disposed on the crankshaft 10 such that upon rotation of the crankshaft 10, the contact bar 66 sequentially contacts each of the tines 62.

The tines 62 preferably are formed from flexible, yet resilient, pieces of metal, however other suitable embodiments may also be used. The tines 62 are preferably made of copper, but any suitable electrical conductive may be employed. The contact bar 66 must be attached to insulating material, such as plastic, which is bolted to the crankshaft 10 or secured in any other conventional manner. Low power positive cable 68 is attached to the center of the insulating material in such a manner that an electrically conductive path is formed between the positive cable 68 and contact bar 66. This can be accomplished by a wire disposed within the insulating material bolted to the crankshaft 10.

It may also be preferable to distribute electricity through an electrically isolated distributor attached to the end of the crankshaft 10, or connected to the crankshaft 10 via a chain or similar connector. Because low power is being distributed by the low power distribution control assembly 38, an ordinary car distributor may be used instead if appropriately modified.

Figure 9:
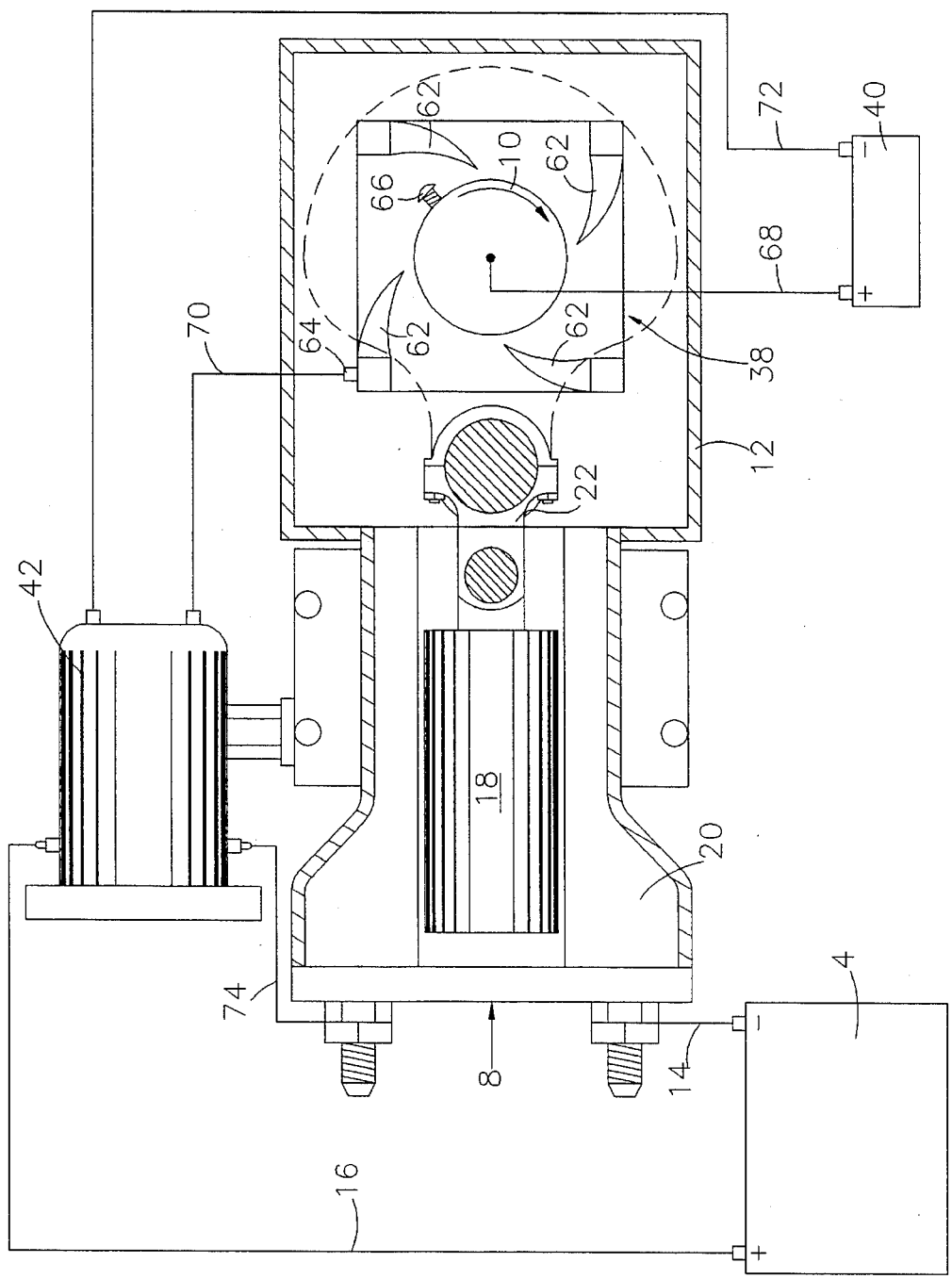
FIG. 9 is an end view, partially cut away, of the electric motor according to the second embodiment of the present invention.

As shown in FIG. 9, the positive terminal of the low power source 40 is connected to the insulator bolted to the crankshaft 10 via a low power positive cable 68. When the contact bar 66 contacts the tine 62, electricity flows through low power connection cable 70, activates the low power distribution solenoid 42, and flows back through the low power negative cable 72 to low power source 40.

Upon activation of the low power distribution solenoid 42, an electrically conductive path is formed from the positive terminal of the power source 4, through the positive cable 16, the low power distribution solenoid 42, the connection cable 74, the solenoid 8, the negative cable 14 and back to the negative terminal of the power source 4. This electrically conductive path energizes the solenoid 8, causing the core 18 to be pulled into the void in the body 20, thereby exerting a force on crankshaft 10 through the connecting rod 22.

Thus, the low power distribution control assembly 38 controls the timing of the firing of the control solenoids 42 which in turn controls the firing of the solenoids 8. By using two sets of solenoids, high power - high amperage electricity may be efficiently distributed to the high power solenoids 8 without burning out the contact points of the switch 38. Because low power is distributed by a rotary timing mechanism 38, the rotary timing mechanism 38 does not tend to burn out. Because the low power distribution solenoids 42 have contacts which rapidly, linearly, switch between the "on" position and the "off" position, the high power switches do not tend to arc, and thus, an electrical motor utilizing this form of switching mechanism displays enhanced resistance to mechanical failure due to contact burn out.

An engine was produced according to the description of the present invention which weighed 45 lbs. and produced 40 foot-lbs. of torque.

In this engine, one low power solenoid may be used to trigger all four main solenoids, if a second distributor is included, by switching the high power wires connected to the low power solenoid while the low power solenoid is not activated. In this case, the low power solenoid would operate in the same manner as any one of the low power solenoids described above, except that the same low power solenoid would open and close every time any cylinder was to fire. While the low power solenoid was open, that is the contact plate 57 was not in contact with terminals 60, a second distributor would switch the electrically conductive path from one solenoid to the next so that a different solenoid would be energized when the low power solenoid closed.

Although the present invention has been fully described by way of example with reference to the accompanying drawings, it is to be understood that various changes and modifications will be apparent to those skilled in the art. Therefore, unless such changes depart from the scope of the invention as defined by this specification and claims, they should be construed as being included herein.

What is claimed is:

1. An electric vehicle solenoid motor, comprising:

a crankshaft disposed in a housing, said crankshaft having an eccentric lobe;

at least one solenoid having a core operatively connected to said crankshaft;

a power distribution control assembly disposed adjacent said crankshaft at the location of said eccentric lobe;

an electrical power source operatively connected to said solenoid so as to pass electric power through said power distribution control assembly to said solenoid; and wherein said power distribution control assembly has at least one power director disposed about said crankshaft, said power director having a contact rod and a contact plate, said contact rod being moveable by said eccentric lobe of said crankshaft such that rotation of said crankshaft causes linear displacement of said contact rod so that said contact plate of said power director allows passage of electrical power from said electrical power source to said solenoid by engaging said contact plate with contacts connected to terminals of said solenoid.

2. An electric vehicle solenoid motor as defined in claim 1, wherein said eccentric lobe is disposed at one end of crankshaft.

3. An electric vehicle solenoid motor as defined in claim 1, further comprising four solenoids operatively connected to said crankshaft; and four power directors disposed around said crankshaft at 90 degree intervals.

4. An electric vehicle solenoid motor as defined in claim 1, wherein said contact rod of said power director is biased toward said crankshaft by a spring.

5. An electric vehicle solenoid motor as defined in claim 1, wherein said contact plate is integral with said contact rod.

6. An electric vehicle solenoid motor as defined in claim 1, wherein there are the same number of solenoids as power directors.

7. An electric vehicle solenoid motor as defined in claim 1, further comprising a connecting rod attaching said core to said crankshaft.

8. An electric vehicle solenoid motor, comprising:

a crankshaft disposed in a housing;

at least one high-power solenoid having a core operatively connected to said crankshaft;

a high-power distribution control assembly;

a high-power electrical power source connected to said high-power solenoid through said high-power distribution control assembly;

a low-power distribution control assembly; and a low-power electrical power source connected to said high-power distribution control assembly through said low-power distribution control assembly; and wherein said high power distribution control assembly comprises a plurality of low-power solenoids; and said low-power distribution control assembly comprises a plurality of tines which are contacted by a contact bar so that as the crankshaft rotates, low power is selectively transferred to said low-power solenoids in such a manner as to allow high-power from said high-power electrical power source to be transferred to said high-power solenoids, thereby causing said core to move said crankshaft.

9. An electric vehicle solenoid motor as defined in claim 8, wherein the number of said tines is equal to the number of said low-power solenoids.

10. An electric vehicle solenoid motor as defined in claim 8, wherein the number of said low-power solenoids is equal to the number of said high-power solenoids.

11. An electric vehicle solenoid motor, comprising:

a crankshaft disposed in a housing, said crankshaft having a protrusion;

at least one solenoid having a core operatively connected to said crankshaft;

a power distribution control assembly disposed adjacent said crankshaft at the location of said protrusion;

an electrical power source operatively connected to said solenoid so as to pass electric power through said power distribution control assembly to said solenoid; and wherein said power distribution control assembly has at least one power director disposed about said crankshaft, said power director having a contact moveable by said protrusion of said crankshaft such that rotation of said crankshaft causes displacement of said contact so that said power director allows passage of electrical power from said electrical power source through said power director to said solenoid.

12. An electric vehicle solenoid motor as defined in claim 11, wherein said power distribution control assembly is disposed at one end of said crankshaft.

13. An electric vehicle solenoid motor as defined in claim 11, wherein there are the same number of solenoids as power directors.

14. An electric vehicle solenoid motor as defined in claim 11, further comprising four solenoids operatively connected to said crankshaft; and four power directors disposed around said crankshaft at 90 degree intervals.

15. An electric vehicle solenoid motor as defined in claim 11, wherein said contact of said power director is biased toward said crankshaft by a spring.

16. An electric vehicle solenoid motor as defined in claim 11, further comprising a connecting rod attaching said core to said crankshaft.

17. An electric vehicle solenoid motor as defined in claim 11, wherein said power distribution control assembly contains at least one low-power solenoid and a plurality of tines, so that as the crankshaft rotates low power is selectively transferred to said low-power solenoids in such a manner as to allow power from said electrical power source to be transferred to said solenoids, thereby causing said core to move said crankshaft.

18. An electric vehicle solenoid motor as defined in claim 17, wherein the number of said tines is equal to the number of said low-power solenoids, and the number of said low-power solenoids is equal to the number of said solenoids.

19. An electric vehicle solenoid motor, comprising:

a crankshaft disposed in a housing, said crankshaft having an eccentric lobe;

at least one solenoid having a core operatively connected to said crankshaft;

a power distribution control assembly disposed adjacent said crankshaft at the location of said eccentric lobe;

an electrical power source operatively connected to said solenoid so as to pass electric power through said power distribution control assembly to said solenoid; and wherein said power distribution control assembly has at least one power director disposed about said crankshaft, said power director having a contact rod integral with a contact plate, said contact rod being moveable by said eccentric lobe of said crankshaft such that rotation of said crankshaft causes linear displacement of said contact rod and said contact plate then allows passage of electrical power from said electrical power source to said solenoid.

20. An electric vehicle solenoid motor as defined in claim 9, further comprising a connecting rod connecting said core to said crankshaft.

* * * * *